US011874623B2

(12) United States Patent
Yamaguchi

(10) Patent No.: US 11,874,623 B2
(45) Date of Patent: Jan. 16, 2024

(54) IMAGE FORMING APPARATUS CAPABLE OF MINIMIZING NUMBER OF REVOLUTIONS OF MOTOR

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/655,501

(22) Filed: Mar. 18, 2022

(65) Prior Publication Data

US 2022/0317618 A1 Oct. 6, 2022

(30) Foreign Application Priority Data

Mar. 30, 2021 (JP) ................................ 2021-058005

(51) Int. Cl.
*G03G 15/00* (2006.01)

(52) U.S. Cl.
CPC .................................. *G03G 15/757* (2013.01)

(58) Field of Classification Search
None
See application file for complete search history.

(56) References Cited

U.S. PATENT DOCUMENTS 5,214,472 A * 5/1993 Czuprynski ............... F16G 1/20 474/272
2011/0293329 A1* 12/2011 Konishi .................... F16H 7/02 399/167
2012/0051788 A1* 3/2012 Tsuji .................... G03G 15/757 399/167
2013/0038017 A1* 2/2013 Matsui ................... B65H 31/02 271/270
2014/0064752 A1* 3/2014 Tsuji ...................... G03G 15/55 474/84
2014/0235384 A1* 8/2014 Yamaguchi ......... F16H 57/0489 474/93
2014/0346727 A1 11/2014 Shiraishi et al.
2015/0043942 A1* 2/2015 Okuno ................. G03G 15/757 399/167
2015/0233445 A1* 8/2015 Yamaguchi .......... G03G 15/757 474/272
2016/0342125 A1* 11/2016 Nito .................. G03G 15/6529
2020/0195806 A1 6/2020 Fukuda
2020/0218177 A1* 7/2020 Ishido .................. G03G 15/757

FOREIGN PATENT DOCUMENTS

JP 2002082527 A * 3/2002 ............. B82Y 15/00
JP 3635618 B2 * 4/2005 ......... G03G 15/0126
JP 2020076499 A 5/2020
WO 2013111483 A1 8/2013
WO 2019039615 A1 2/2019

* cited by examiner

*Primary Examiner* — Sevan A Aydin
(74) *Attorney, Agent, or Firm* — Alleman Hall Creasman & Tuttle LLP

(57) ABSTRACT

An image forming apparatus includes a photoconductor drum and a drive device. A latent image is to be formed on the photoconductor drum. The drive device drives the photoconductor drum. The drive device includes a motor, a drive pulley, a driven pulley, and a metal belt. The drive pulley is provided for the motor. The driven pulley is provided for the photoconductor drum. The metal belt is wrapped around the drive pulley and the driven pulley.

7 Claims, 6 Drawing Sheets

IMAGE FORMING APPARATUS CAPABLE OF MINIMIZING NUMBER OF REVOLUTIONS OF MOTOR

INCORPORATION BY REFERENCE

This application is based upon and claims the benefit of priority from the corresponding Japanese Patent Application No. 2021-058005 filed on Mar. 30, 2021, the entire contents of which are incorporated herein by reference.

BACKGROUND

The present disclosure relates to an image forming apparatus that forms images on sheets.

Regulations on noise produced by image forming apparatuses are being tightened in recent years. To follow those regulations, technologies that eliminate or minimize the noise of the image forming apparatuses have been considered.

SUMMARY

An image forming apparatus according to the present disclosure includes a photoconductor drum and a drive device. A latent image is to be formed on the photoconductor drum. The drive device drives the photoconductor drum. The drive device includes a motor, a drive pulley, a driven pulley, and a metal belt. The drive pulley is provided for the motor. The driven pulley is provided for the photoconductor drum. The metal belt is wrapped around the drive pulley and the driven pulley.

In addition, an image forming apparatus according to the present disclosure includes a plurality of developing devices and a plurality of drive devices. The plurality of developing devices develop latent images. The drive devices are provided for the respective developing devices. The plurality of drive devices each include a stepper motor and a reduction gear. Each of the reduction gears transmits driving force generated by the stepper motor to the corresponding developing device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes a printer 1 (an example of an image forming apparatus) according to an embodiment of the present disclosure with reference to the drawings.

Figure 1:
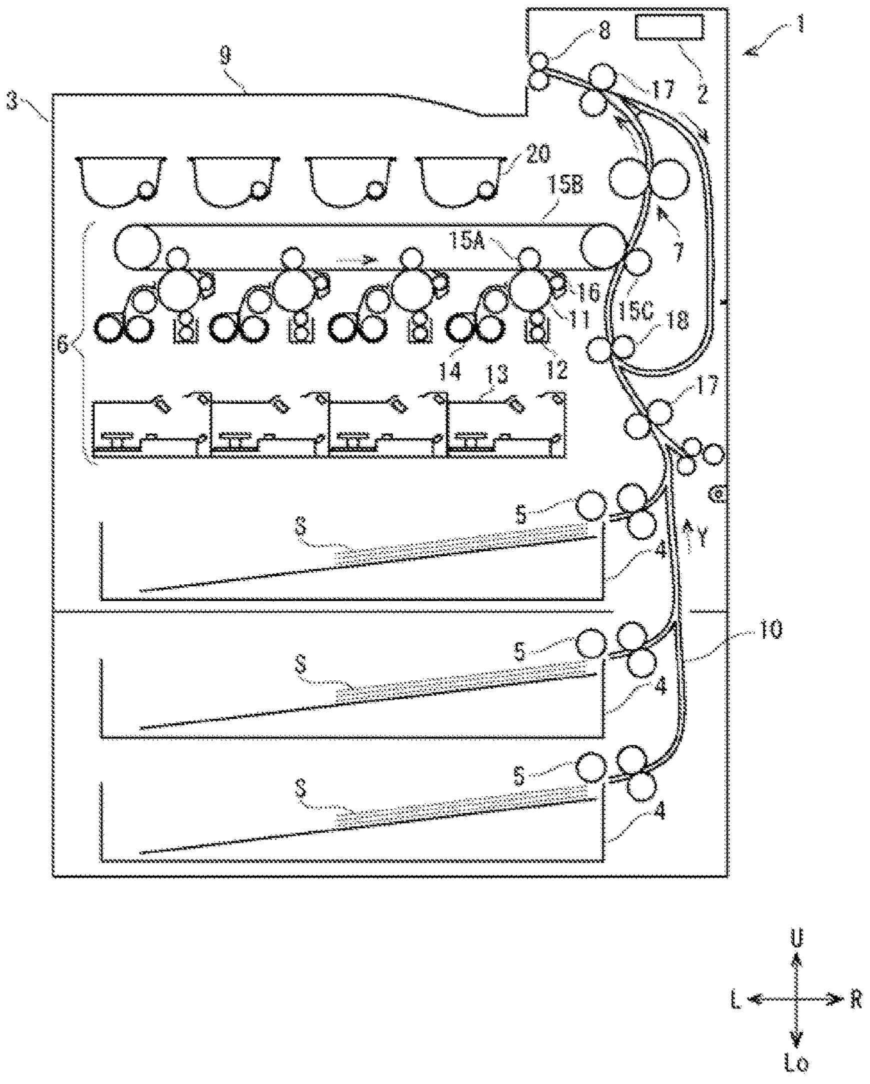
FIG. 1 is a front view schematically showing the internal configuration of an image forming apparatus according to an embodiment of the present disclosure.

First, the overall configuration of the printer 1 will be described. FIG. 1 is a front view schematically showing the internal configuration of the printer 1. In the description below, the face of the printer 1 on the front side of the page in FIG. 1 is defined as the front (front face), and the left and right are defined relative to the direction in which the printer 1 is viewed from the front. In the drawings, U, Lo, L, R, Fr, and Rr respectively indicate upper, lower, left, right, front, and rear.

The printer 1 includes a rectangular parallelepiped housing 3. Sheet feed cassettes 4 that house sheets S and sheet feed rollers 5 that feed the sheets S from the sheet feed cassettes 4 are disposed in a lower part inside the housing 3. An image creating device 6 that forms toner images by an electrophotographic method is disposed above the sheet feed cassettes 4, and a fixing device 7 that fixes the toner images onto the sheets S is disposed above and to the right of the image creating device 6. A pair of sheet discharge rollers 8 that discharges the sheets S with the toner images fixed thereon and a sheet discharge tray 9 on which the discharged sheets S are stacked are disposed above and to the left of the fixing device 7.

A conveyance path 10 extends from the sheet feed rollers 5 to the pair of sheet discharge rollers 8 through the image creating device 6 and the fixing device 7 inside the housing 3. The conveyance path 10 is composed of panel members facing each other with a gap that allows passage of the sheets S therebetween, and pairs of conveying rollers 17 that hold and convey the sheets S are arranged at multiple points on the conveyance path 10 in a conveying direction Y. A pair of registration rollers 18 is disposed upstream of the image creating device 6 in the conveying direction.

The image creating device 6 includes photoconductor drums 11 of which the potentials change with incidence of light, charging devices 12 that charge the photoconductor drums 11 by electric discharge, exposure devices 13 that emit laser beams based on image data, developing devices 14 that supply toner for the photoconductor drums 11, primary transfer rollers 15A that generate transfer biases, an intermediate transfer belt 15B to which toner images on the photoconductor drums 11 are to be transferred, a secondary transfer roller 15C that generates a transfer bias, and cleaning devices 16 that remove remaining toner from the photoconductor drums 11. Each of the developing devices 14 is connected to a toner container 20 that supplies the toner for the developing device 14.

A control portion 2 includes a processor and a memory. For example, the processor is a CPU (Central Processing Unit). The memory includes a storage medium such as a ROM (Read Only Memory), a RAM (Random Access Memory), and an EEPROM (Electrically Erasable Programmable Read Only Memory). The processor reads and executes control programs stored in the memory to perform various types of processing. The control portion 2 may be implemented by an integrated circuit that does not use software.

The following describes a basic image forming operation of the printer 1. When a print job is input from an external computer or the like to the printer 1, one of the sheet feed rollers 5 feeds a sheet S from the corresponding sheet feed cassette 4 to the conveyance path 10. The pair of registration rollers 18, which is not rotating, corrects the inclination of the sheet S and then rotates to feed the sheet S to the image creating device 6 at a predetermined timing. In the image creating device 6, the charging devices 12 charge the photoconductor drums 11 to predetermined potentials. The exposure devices 13 form latent images on the photoconductor drums 11. The developing devices 14 develop the latent images using the toner supplied from the toner containers 20 to form toner images. The primary transfer rollers 15A transfer the toner images on the photoconductor drums 11 to the intermediate transfer belt 15B. The secondary transfer roller 15C transfers the toner image on the intermediate transfer belt 15B to the sheet S. The fixing device 7 fuses the toner image while holding and conveying the sheet S to fix the toner image onto the sheet S. The pair of sheet discharge rollers 8 discharges the sheet S to the sheet discharge tray 9. The cleaning devices 16 removes remaining toner from the photoconductor drums 11.

[Drive Device of Photoconductor Drum]

Figure 2:
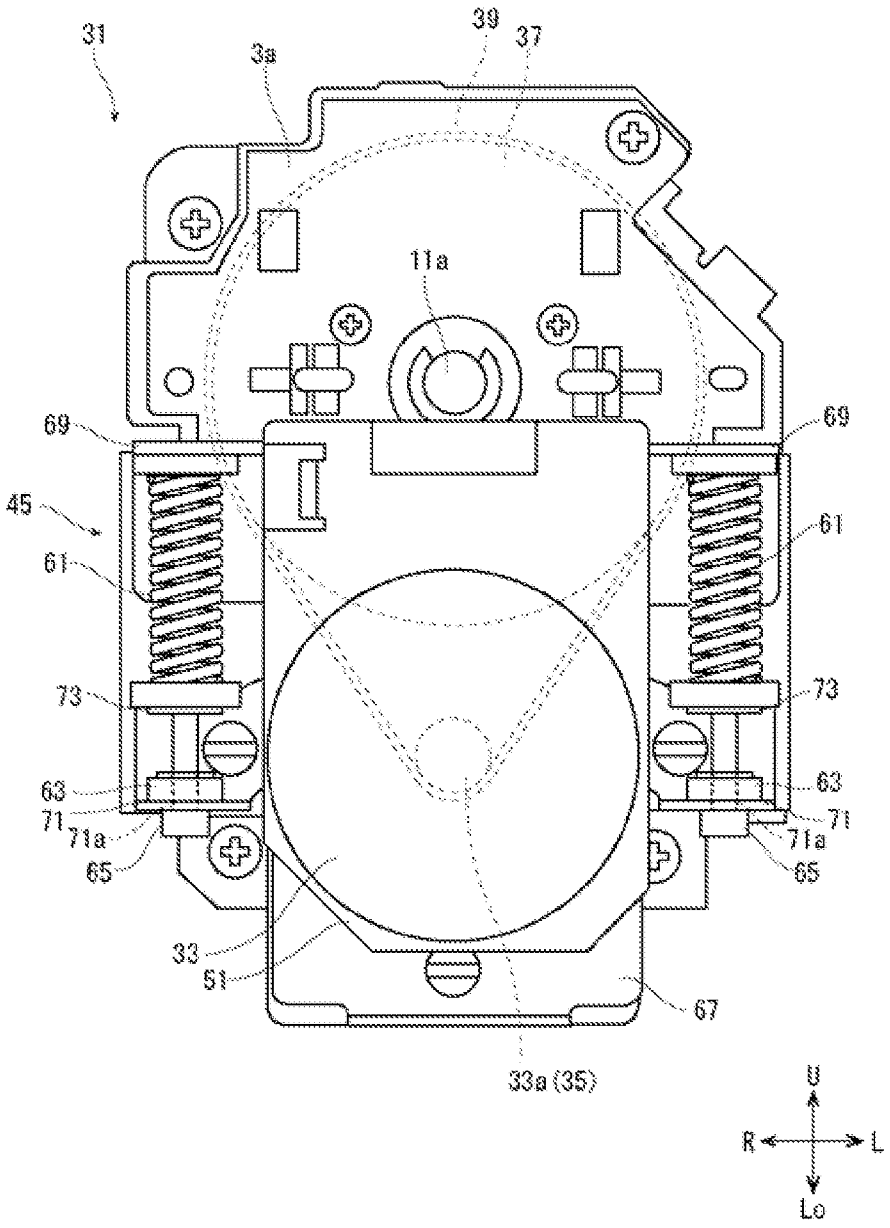
FIG. 2 is a rear view of a drive device according to the embodiment of the present disclosure.
Figure 3:
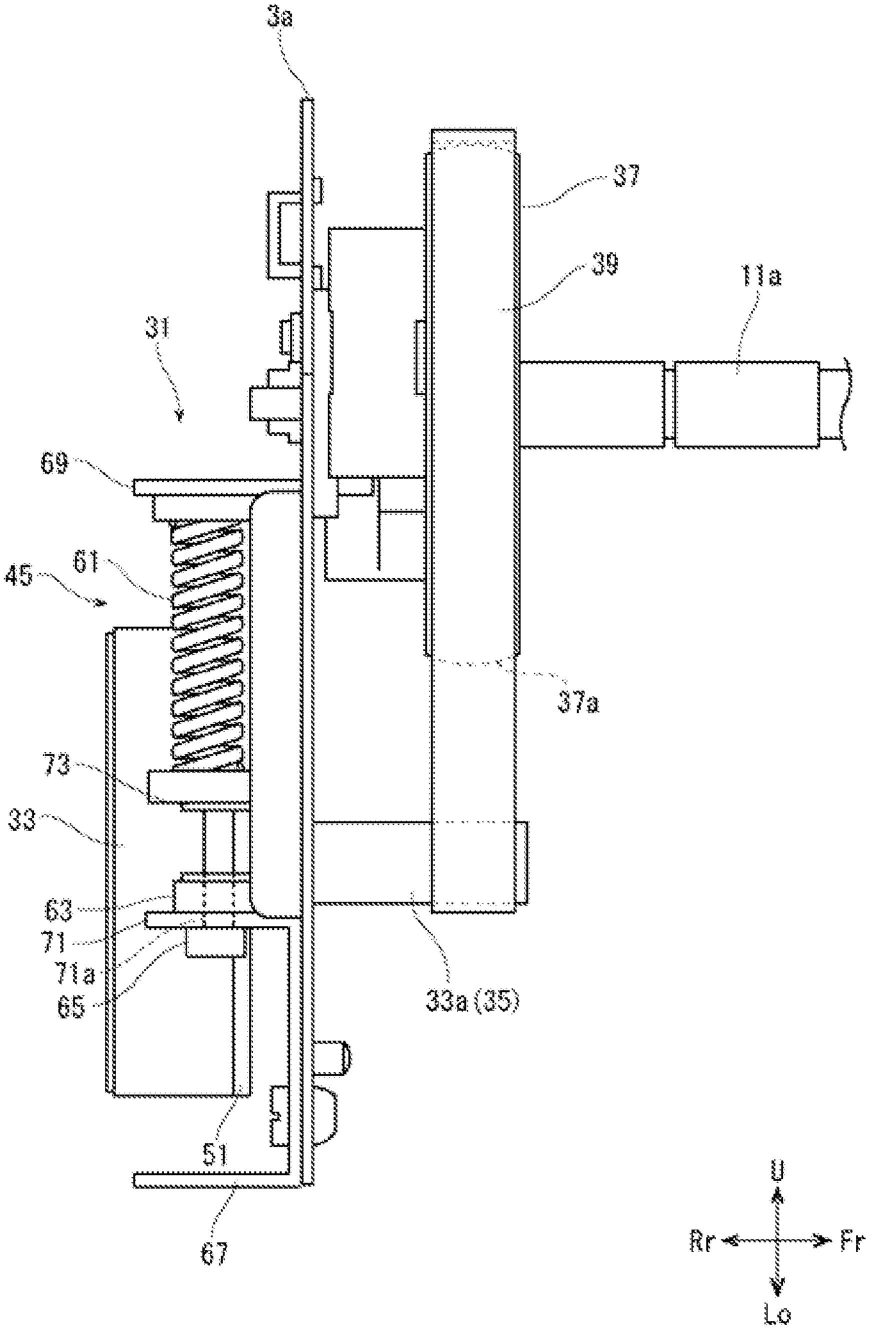
FIG. 3 is a left side view showing the internal configuration of the drive device according to the embodiment of the present disclosure.

Next, drive devices 31 that drive the photoconductor drums 11 will be described. FIG. 2 is a rear view of the drive device 31. FIG. 3 is a left side view showing the internal configuration of the drive device 31.

The printer 1 includes the photoconductor drums 11 on which latent images are to be formed and the drive devices 31 that drive the photoconductor drums 11. Each of the drive devices 31 includes a motor 33, a drive pulley 35 provided for the motor 33, a driven pulley 37 provided for the corresponding photoconductor drum 11, and a metal belt 39 wrapped around the drive pulley 35 and the driven pulley 37.

Specifically, the drive device 31 transmits driving force to the rotation shaft 11*a* of the photoconductor drum 11. The rotation shaft 11*a* of the photoconductor drum 11 is rotatably supported by a frame 3*a* integral to the housing 3.

Each of the drive devices 31 includes the motor 33, the drive pulley 35, the driven pulley 37, the metal belt 39 wrapped around the drive pulley 35 and the driven pulley 37, and a tension adjustment portion 45 that adjusts the tension of the metal belt 39. In the present embodiment, the output shaft 33*a* of the motor 33 also serves as the drive pulley 35. However, another drive pulley 35 separate from the output shaft 33*a* may be secured to the output shaft 33*a* of the motor 33.

The motor 33 is a brushless motor and secured to a support plate 51 disposed behind the frame 3*a*. The output shaft 33*a* of the motor 33 passes through the support plate 51 and the frame 3*a*. The support plate 51 is supported by the frame 3*a* to be movable in the vertical direction relative to the frame 3*a*.

The driven pulley 37 is disposed above the drive pulley 35 and secured to an end of the rotation shaft 11*a* of the photoconductor drum 11. The driven pulley 37 has a larger diameter than the drive pulley 35. The driven pulley 37 includes an expanded portion 37*a* expanded radially outward from the outer peripheral surface of the driven pulley 37. The expanded portion 37*a* protrudes radially outward in the middle of the thickness and tapers off toward either edge so that the driven pulley 37 is crowned.

The metal belt 39 is an endless belt. For example, the metal belt 39 is formed from a non-magnetic metal material such as SUS304 (austenitic stainless steel). The metal belt 39 is wrapped around the drive pulley 35 and the driven pulley 37. Because the driven pulley 37 includes the expanded portion 37*a* on the outer peripheral surface thereof, the metal belt 39 comes into contact with a part of the expanded portion 37*a* with the largest outside diameter.

The tension adjustment portion 45 includes two coil springs 61 and two pairs of an internally threaded portion 63 and an externally threaded portion 65 fastened to each other. The two coil springs 61 and the two pairs of the internally threaded portion 63 and the externally threaded portion 65 are disposed on either side, one on the left and the other on the right, of the motor 33. The support plate 51 includes two upper spring bracket pieces 69 on either side of the motor 33, and a secured plate 67 secured to the frame 3*a* includes two lower spring bracket pieces 71 on either side of the motor 33. The upper spring bracket pieces 69 and the lower spring bracket pieces 71 face each other in the vertical direction. The lower spring bracket pieces 71 each have a through-hole 71*a*. Each of the internally threaded portions 63 is secured to the upper surface of the corresponding lower spring bracket piece 71 to be coaxial to the through-hole 71*a*. Each of the externally threaded portions 65 passes through the through-hole 71*a* of the corresponding lower spring bracket piece 71 from below and is screwed in the corresponding internally threaded portion 63. An abutment plate 73 is secured to the end of each externally threaded portion 65.

The upper end of each coil spring 61 abuts on the corresponding upper spring bracket piece 69. The lower end of each coil spring 61 abuts on the corresponding abutment plate 73. The coil springs 61 bias the support plate 51 downward relative to the frame 3*a*. That is, the coil springs 61 bias the output shaft 33*a* (drive pulley 35) of the motor 33 supported by the support plate 51 in a direction away from the driven pulley 37 provided for the photoconductor drum 11 to apply tension to the metal belt 39.

Tightening the externally threaded portions 65 into the internally threaded portions 63 causes the abutment plates 73 to push up the coil springs 61, thereby causing the support plate 51 to move upward. As a result, the distance between the drive pulley 35 and the driven pulley 37 decreases, and thus the tension of the metal belt 39 is adjusted to be lower. Conversely, loosening the externally threaded portions 65 from the internally threaded portions 63 causes the abutment plates 73 to pull down the coil springs 61, thereby causing the support plate 51 to move downward. As a result, the distance between the drive pulley 35 and the driven pulley 37 increases, and thus the tension of the metal belt 39 is adjusted to be higher.

In the drive device 31 with the above-described configuration, rotation of the motor 33 causes the drive pulley 35 to rotate, thereby causing the driven pulley 37 to rotate with the metal belt 39. Thus, the rotation shaft 11*a* to which the driven pulley 37 is secured rotates, and the photoconductor drum 11 rotates.

[Drive Device of Developing Device]

Figure 4:
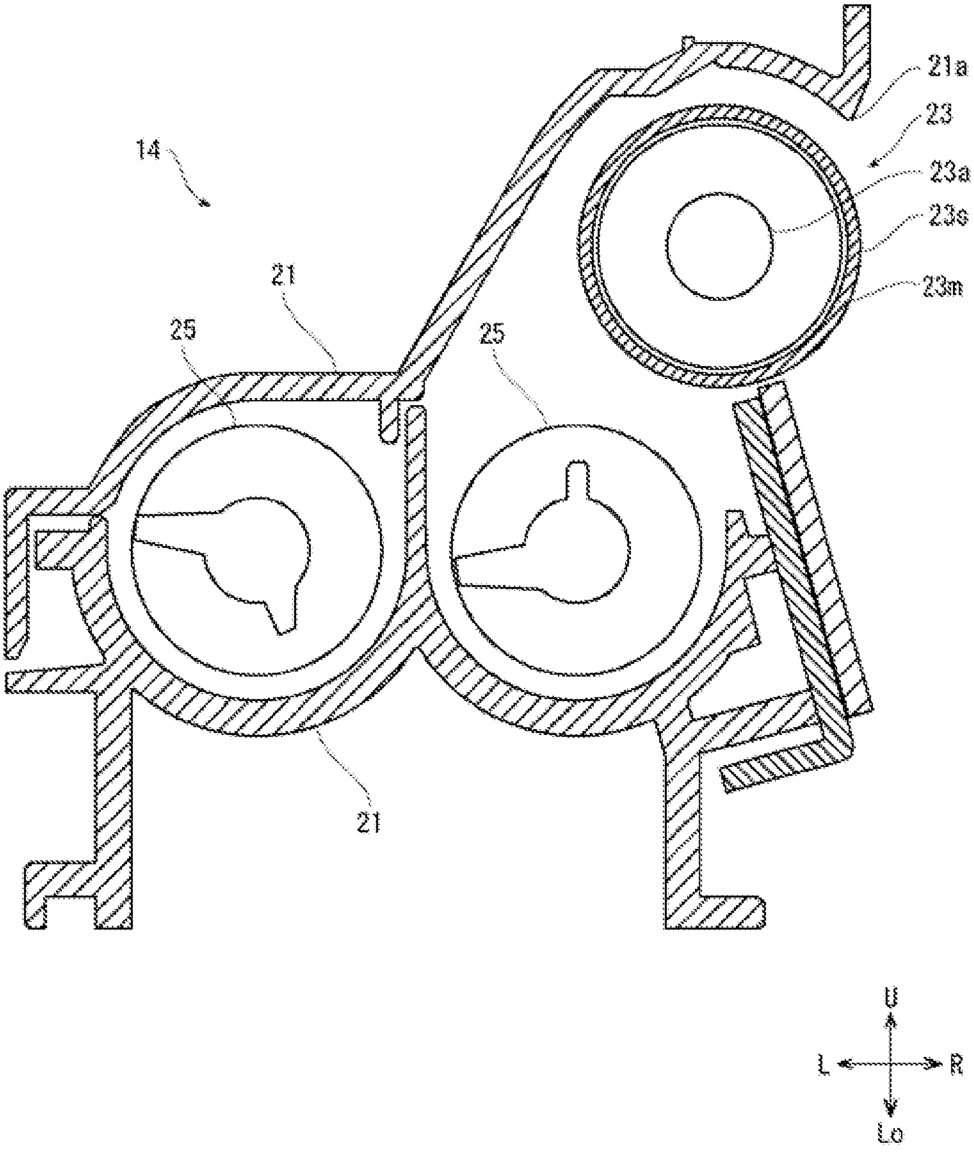
FIG. 4 is a cross-sectional view of a developing device according to the embodiment of the present disclosure.
Figure 5:
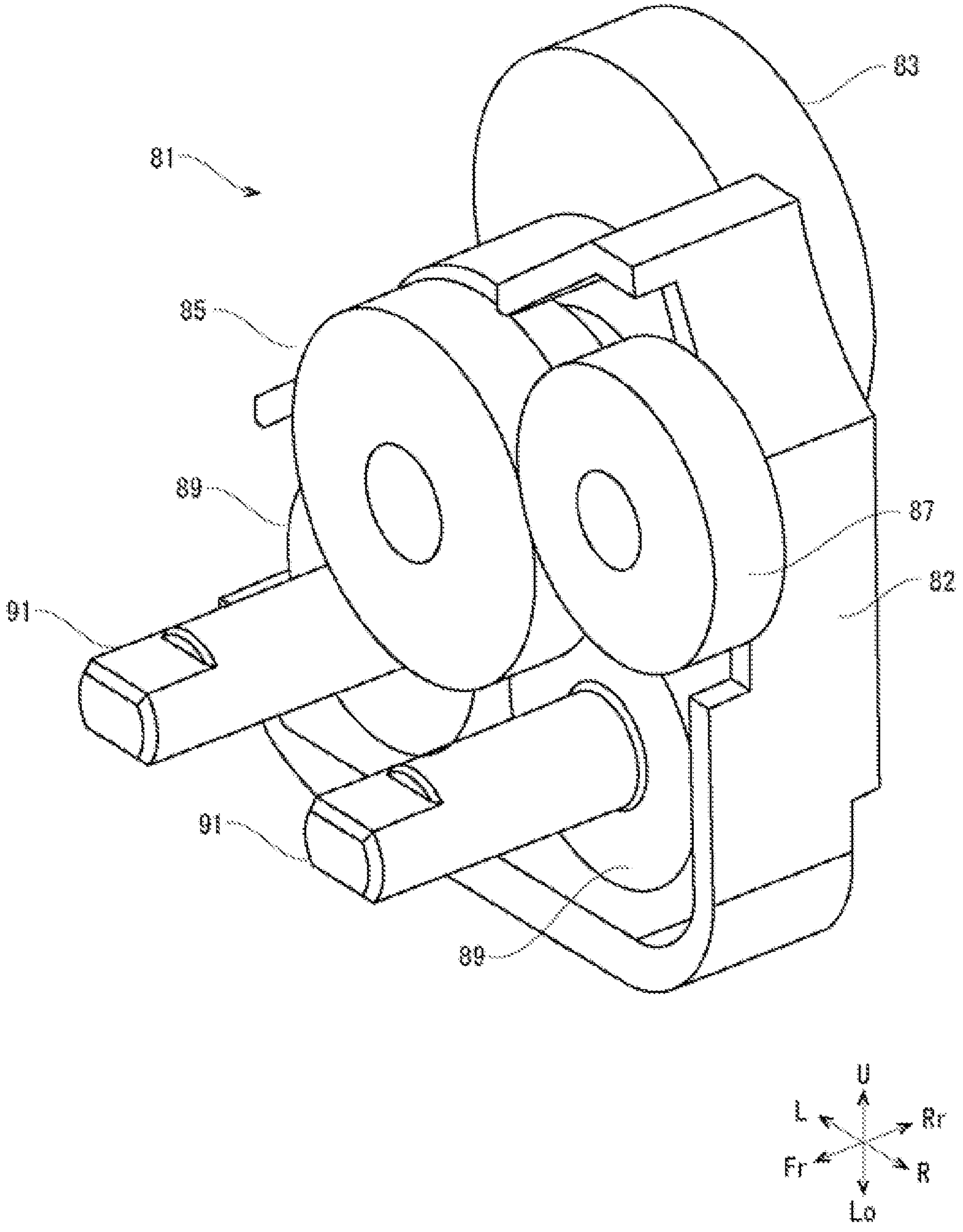
FIG. 5 is a perspective view of a drive device according to the embodiment of the present disclosure.

Next, drive devices 81 that drive the developing devices 14 will be described. FIG. 4 is a cross-sectional view of the developing device 14. FIG. 5 is a perspective view of the drive device 81.

The printer 1 includes the plurality of developing devices 14 that develop latent images and the drive devices 81 provided for the respective developing devices 14. Each of the drive devices 81 includes a stepper motor 83 and a reduction gear 85 that transmits the driving force generated by the stepper motor 83 to the corresponding developing device 14.

Each of the developing devices 14 includes a housing 21 having a box shape elongated in the front-rear direction. A developing roller 23 and two screws 25 are disposed parallel to each other inside the housing 21 such that the axes extend in the front-rear direction. The two screws 25 are arranged in the bottom of the housing 21, one on the left and the other on the right, and the developing roller 23 is disposed above the right screw 25. The housing 21 has an opening 21*a* in a part to the right of the developing roller 23, and the outer peripheral surface of the developing roller 23 exposed through the opening 21*a* faces the outer peripheral surface of the corresponding photoconductor drum 11 at a predetermined distance. A toner supply path (not shown) extends between the housing 21 and the corresponding toner container 20. The housing 21 stores magnetic carrier in the bottom thereof. The screws 25 stir and mix the magnetic carrier and toner supplied from the toner container 20 to produce two-component developer.

The developing roller 23 includes a rotation shaft 23*a*, a pole member 23*m* disposed around the rotation shaft 23*a*, and a cylindrical developing sleeve 23*s* that covers the pole member 23*m* with a predetermined space therebetween. The developing sleeve 23*s* is formed from a non-magnetic material. The rotation shaft 23*a* is supported by the housing 21 and rotates in a predetermined direction with the developing sleeve 23*s*. The pole member 23*m* does not rotate.

The printer 1 includes the plurality of developing devices 14 and the same number of (four in this example) drive devices 81, and each of the developing devices 14 is provided with the corresponding drive device 81. Each of the drive devices 81 includes a housing 82, the stepper motor 83, the reduction gear 85, a developing roller gear 87, and screw gears 89. The housing 82 has an opening in the front and holds the reduction gear 85, the developing roller gear 87, and the screw gears 89. The stepper motor 83 is disposed at the rear of the housing 82.

The stepper motor 83 is of the PM (Permanent Magnet) type that uses a permanent magnet as a rotor. The reduction gear 85 meshes with an output gear (not shown) provided for the output shaft of the stepper motor 83. The reduction gear 85 has a larger diameter than the output gear of the stepper motor 83. The developing roller gear 87 is connected to the shaft of the developing roller 23. The screw gears 89 are connected to the screws 25 through shaft couplings 91 with D-cuts.

The reduction gear 85 meshes with the developing roller gear 87 and transmits the driving force of the stepper motor 83 to the developing roller gear 87 at a reduced speed. In addition, the developing roller gear 87 meshes with the screw gears 89, and the driving force is transmitted to the screw gears 89 through the developing roller gear 87. The driving force may be transmitted to the screw gears 89 not through the developing roller gear 87 but directly from the reduction gear 85.

In the drive device 81 with the above-described configuration, rotation of the stepper motor 83 causes the driving force to be transmitted to the developing roller gear 87 and the screw gears 89 through the output gear and the reduction gear 85, thereby causing the developing roller 23 and the screws 25 to rotate.

As described above, the printer 1 according to the present embodiment includes the photoconductor drums 11 on which latent images are to be formed and the drive devices 31 that drive the photoconductor drums 11. Each of the drive devices 31 includes the motor 33, the drive pulley 35 provided for the motor 33, the driven pulley 37 provided for the corresponding photoconductor drum 11, and the metal belt 39 wrapped around the drive pulley 35 and the driven pulley 37. To drive the photoconductor drums 11 with higher rotational accuracy, the stiffness of the drive devices 31 needs to be increased. To increase the stiffness, known driven gears formed from resin have large diameters, which reduce the load on each tooth and minimize deformation of the teeth. However, this configuration prevents the reduction ratio from being reduced, requiring the number of revolutions of the motor 33 to be set to a high value. In contrast, the present disclosure uses the metal belt 39 instead of a resin gear. This enables the reduction ratio to be reduced without reducing the stiffness. As a result, the number of revolutions of the motor 33 of which the driving force is transmitted through the reduction mechanism can be minimized, causing the noise of the motor 33 to be reduced.

In the printer 1 according to the present embodiment, the number of revolutions of the motor 33 is desirably less than or equal to 2,000 rpm (revolutions per minute). By reducing the number of revolutions to 2,000 rpm or less, the noise level can be brought into compliance with standards such as The Blue Angel.

In addition, the printer 1 according to the present embodiment includes the developing devices 14 that develop latent images and the drive devices 81 provided for the respective developing devices 14. Each of the drive devices 81 includes the stepper motor 83 and the reduction gear 85 that transmits the driving force generated by the stepper motor 83 to the corresponding developing device 14. A known full-color printer drives four developing devices 14 using one or two brushless motors and thus requires high torque. Accordingly, the reduction ratio needs to be increased, and, at the same time, the number of revolutions of the motor needs to be increased. In contrast, the present disclosure uses one stepper motor 83 for one developing device 14. This reduces the load of torque of each stepper motor 83. As a result, the number of revolutions of the stepper motor 83 of which the driving force is transmitted through the reduction mechanism can be minimized, enabling a reduction in the noise of the stepper motor 83.

In the printer 1 according to the present embodiment, the number of revolutions of the stepper motor 83 is desirably less than or equal to 2,000 rpm. By reducing the number of revolutions to 2,000 rpm or less, the noise level can be brought into compliance with standards such as The Blue Angel.

Figure 6:
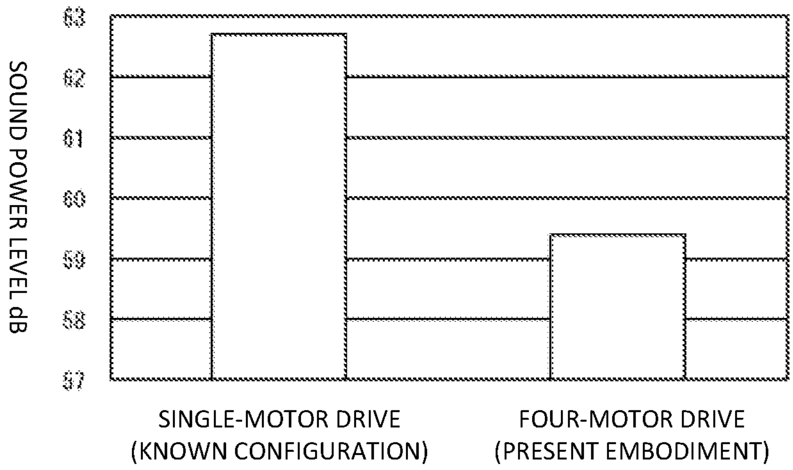
FIG. 6 shows a measurement result of sound power level of the drive device according to the embodiment of the present disclosure.

FIG. 6 shows measurement results of sound power level of the drive devices 81. The measurement result on the left is obtained from a known configuration in which four developing devices 14 are driven by one brushless motor. The measurement result on the right is obtained from the present embodiment in which each of the four developing devices 14 is driven by one stepper motor 83. In the present embodiment, the sound power level was reduced by greater than or equal to 3 dB compared with the known configuration.

In addition, the stepper motors 83 of the printer 1 according to the present embodiment are of the PM type. This can reduce the size and cost of the drive devices 81.

The above-described embodiment can be modified as follows.

The stepper motors 83 in the above-described embodiment are of the PM type. However, the stepper motors 83 may be of the VR (Variable Reluctance) type instead of the PM type.

Loss of synchronization (desynchronization of the input signal and the rotation) of the stepper motors 83 is caused by, for example, overloads or variations in speed and tends to occur in motors with low torque. Accordingly, an additional driver having the function of avoiding the loss of synchronization is desirably provided for the configuration of the above-described embodiment. For example, the driver having the function of avoiding the loss of synchronization acquires information about the positions of the rotors using sensors and feeds back the position information to correct the rotation of the rotors. This configuration can prevent the loss of synchronization of the stepper motors 83.

An additional control device that implements vector control on the motors 33 and the stepper motors 83 may be provided for the configuration of the above-described embodiment. For example, in a case where the drive devices 31 and 81 are made compatible in a slow mode of 20 ppm (page per minute) print speed (for example, the number of pages printed in one minute when the short side of an A4 sheet is parallel to the conveying direction) and in a fast mode of 60 ppm, the number of revolutions of the motors in the slow mode needs to be reduced to about 300 rpm to reduce the number of revolutions in the fast mode to 2,000 rpm or less. The lowest usable number of revolutions of known motors is about 700 rpm. However, implementation of vector control can reduce the lowest usable number of revolutions to about 300 rpm. Thus, the drive devices 31 and 81 can be made compatible in the slow mode and in the fast mode.

In the above-described embodiment, the drive devices 81 are used to drive the developing devices 14. However, the drive devices 81 may be used to drive the pairs of conveying rollers 17 that convey the sheets S along the conveyance path 10, the intermediate transfer belt 15B, and the like.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
- a plurality of photoconductor drums on which a latent image is to be formed;
- a plurality of first drive devices each provided for a corresponding one of the plurality of photoconductor drums;
- a plurality of developing devices corresponding to the plurality of photoconductor drums; and
- a plurality of second drive devices each provided for a corresponding one of the plurality of developing devices, wherein
- each of the plurality of first drive devices includes:
  - a motor;
  - a drive pulley provided for the motor;
  - a driven pulley provided for the corresponding photoconductor drum; and
  - a metal belt wrapped around the drive pulley and the driven pulley, and
- each of the plurality of second drive devices includes:
  - a stepper motor; and
  - a reduction gear configured to transmit driving force generated by the stepper motor to the corresponding developing device.

2. The image forming apparatus according to claim 1, wherein
- a number of revolutions of the motor of each of the plurality of first drive devices is less than or equal to 2,000 rpm.

3. The image forming apparatus according to claim 1, further comprising:
- a control device configured to implement vector control on the motor of each of the plurality of first drive devices.

4. The image forming apparatus according to claim 1, wherein
- a number of revolutions of the stepper motor of each of the plurality of second drive devices is less than or equal to 2,000 rpm.

5. The image forming apparatus according to claim 1, wherein
- the stepper motor of each of the plurality of second drive devices is of a PM type.

6. The image forming apparatus according to claim 1, further comprising:
- a driver configured to avoid loss of synchronization of the stepper motors.

7. The image forming apparatus according to claim 1, further comprising:
- a control device configured to implement vector control on the stepper motors.

* * * * *